(12) United States Patent
Bowles et al.

(10) Patent No.: US 10,232,929 B2
(45) Date of Patent: Mar. 19, 2019

(54) PLATE MEMBER FOR REDUCING DRAG ON A FAIRING OF AN AIRCRAFT

(71) Applicant: Sikorsky Aircraft Corporation, Stratford, CT (US)

(72) Inventors: Patrick Bowles, Glastonbury, CT (US); ByungYoung Min, Glastonbury, CT (US); Barbara Brenda Botros, Vernon, CT (US); Brian E. Wake, South Glastonbury, CT (US); Claude G. Matalanis, Longmeadow, MA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 192 days.

(21) Appl. No.: 15/266,692

(22) Filed: Sep. 15, 2016

(65) Prior Publication Data

US 2017/0225771 A1    Aug. 10, 2017

Related U.S. Application Data

(60) Provisional application No. 62/269,359, filed on Dec. 18, 2015.

(51) Int. Cl.
*B64C 27/00* (2006.01)
*B64C 7/00* (2006.01)
(Continued)

(52) U.S. Cl.
CPC ............... *B64C 7/00* (2013.01); *B64C 21/04* (2013.01); *B64C 27/10* (2013.01); *B64C 27/32* (2013.01);
(Continued)

(58) Field of Classification Search
CPC ............ B64C 7/00; B64C 21/04; B64C 27/10
See application file for complete search history.

(56) References Cited

U.S. PATENT DOCUMENTS

| 3,005,496 A | 10/1961 | Nichols |
| 3,101,920 A | 8/1963 | Fradenburgh |
(Continued)

FOREIGN PATENT DOCUMENTS

| DE | 1114394 B | 9/1961 |
| ES | 1137506 U | 3/2015 |
| JP | H439198 A | 2/1992 |

OTHER PUBLICATIONS

Extended European Search Report dated Apr. 26, 2017 in related EP Patent Application No. 16194127.3, 9 pages.

*Primary Examiner* — Richard G Davis
(74) *Attorney, Agent, or Firm* — Cantor Colburn LLP (57) ABSTRACT

A rotary wing aircraft includes a fuselage having a plurality of surfaces, at least one engine mounted in the fuselage, and a rotor assembly including a rotor shaft and plurality of rotor blades operatively connected to the rotor shaft. The rotor assembly includes a plurality of surface portions. A rotor shaft fairing extends between the fuselage and the rotor assembly and about at least a portion of the rotor shaft. The rotor shaft fairing includes an outer surface. A plate member is mounted to and projects proudly of the at least a portion of the rotor shaft fairing. The plate member is configured and disposed to increase an aspect ratio of and reduce induced drag on the rotor shaft fairing as well as reduce rotor hub wake size.

12 Claims, 6 Drawing Sheets

(51) Int. Cl.
  *B64C 21/04* (2006.01)
  *B64C 27/10* (2006.01)
  *B64C 27/82* (2006.01)
  *B64C 27/32* (2006.01)

(52) U.S. Cl.
  CPC ...... *B64C 27/82* (2013.01); *B64C 2027/8236* (2013.01); *B64C 2027/8272* (2013.01); *B64C 2027/8281* (2013.01)

(56) References Cited

U.S. PATENT DOCUMENTS

| | | | |
|---|---|---|---|
| 3,130,942 A * | 4/1964 | Fradenburg | B64C 7/00 244/17.11 |
| 3,578,264 A | 5/1971 | Kuethe | |
| 4,212,588 A | 7/1980 | Fradenburgh | |
| 4,216,924 A | 8/1980 | Fradenburgh | |
| 4,598,887 A | 7/1986 | Heinz | |
| 5,727,381 A | 3/1998 | Rogers | |
| 6,105,904 A | 8/2000 | Lisy et al. | |
| 6,837,465 B2 | 1/2005 | Lisy et al. | |
| 7,229,251 B2 | 6/2007 | Bertolotti et al. | |
| 7,413,408 B1 | 8/2008 | Tafoya | |
| 7,530,787 B2 | 5/2009 | Bertolotti et al. | |
| 8,985,503 B2 | 3/2015 | Desroche | |
| 9,764,824 B2 | 9/2017 | Song | |
| 9,868,516 B2 | 1/2018 | Rosenberger et al. | |
| 9,932,481 B2 | 4/2018 | Song | |
| 2004/0129838 A1 | 7/2004 | Lisy et al. | |
| 2006/0134379 A1 | 6/2006 | Pulkka | |
| 2006/0269411 A1 * | 11/2006 | Bertolotti | B64C 1/00 416/134 A |
| 2007/0018056 A1 | 1/2007 | Narramore | |
| 2009/0121075 A1 | 5/2009 | Marze | |
| 2009/0304511 A1 | 12/2009 | Brannon, III | |
| 2011/0036954 A1 | 2/2011 | Piasecki | |
| 2012/0018004 A1 | 1/2012 | Ullman | |
| 2013/0001362 A1 | 1/2013 | Kreuzer et al. | |
| 2013/0214087 A1 | 8/2013 | Corrigan et al. | |
| 2013/0284294 A1 | 10/2013 | Golling et al. | |
| 2013/0291981 A1 | 11/2013 | Cherpinsky et al. | |
| 2014/0255184 A1 | 9/2014 | Sutton | |
| 2014/0317900 A1 | 10/2014 | Desroche | |
| 2015/0147177 A1 * | 5/2015 | Alfano | B64C 7/00 416/134 A |
| 2016/0090171 A1 | 3/2016 | Moret | |
| 2016/0121997 A1 | 5/2016 | Alfano | |
| 2016/0137296 A1 | 5/2016 | Alfano et al. | |
| 2016/0137297 A1 | 5/2016 | Alfano et al. | |
| 2016/0312035 A1 | 10/2016 | Song | |
| 2017/0001722 A1 | 1/2017 | Carpenter et al. | |
| 2017/0025772 A1 | 1/2017 | Yu et al. | |
| 2017/0081021 A1 | 3/2017 | Song | |
| 2017/0088258 A1 | 3/2017 | Alfano et al. | |
| 2017/0174326 A1 | 6/2017 | Bowles et al. | |

* cited by examiner

PLATE MEMBER FOR REDUCING DRAG ON A FAIRING OF AN AIRCRAFT

CROSS-REFERENCE TO RELATED APPLICATIONS

The present application claims priority to U.S. Provisional Application No. 62/269,359 filed on Dec. 18, 2015, the contents of which are incorporated by reference herein in their entirety.

STATEMENT OF FEDERAL SUPPORT

This invention was made with Government support under Contract No.: W911W6-13-P-0010 awarded by the United States Army. The Government has certain rights in the invention.

BACKGROUND

Exemplary embodiments pertain to the art of aircraft and, more particularly, to a plate member for reducing drag on a rotor shaft fairing of an aircraft.

Conventional rotary-wing aircraft have a forward airspeed limited by a number of factors. Among these is the existence of drag when traveling at high speeds. Various surfaces, both stationary and rotating, create drag as the aircraft moves through an airstream. Drag has a direct effect on aircraft power requirements, range, and efficiency. Accordingly, it is desirable to increase an overall airlift-to-drag ratio (L/DE) to enhance an operational envelope of the rotary wing aircraft.

BRIEF DESCRIPTION

Disclosed is a rotary wing aircraft including a fuselage having a plurality of surfaces, at least one engine mounted in the fuselage, and a rotor assembly including a rotor shaft and plurality of rotor blades operatively connected to the rotor shaft. The rotor assembly includes a plurality of surface portions. A rotor shaft fairing extends between the fuselage and the rotor assembly and about at least a portion of the rotor shaft. The rotor shaft fairing includes an outer surface. A plate member is mounted to and projects proudly of at least a portion of the rotor shaft fairing. The plate member is configured and disposed to increase an aspect ratio of and reduce induced drag on the rotor shaft fairing as well as reduce rotor hub wake size.

In addition to one or more of the features described above or below, or as an alternative, further embodiments could include wherein the rotor shaft fairing includes a leading edge surface portion, a trailing edge surface portion, a first lateral side surface portion extending between the leading edge surface portion and the trailing edge surface portion and a second, opposing lateral side surface portion extending between the leading edge portion and the trailing edge portion, the plate member projecting proudly of the trailing edge portion and at least a portion of each of the first and second lateral side portions.

In addition to one or more of the features described above or below, or as an alternative, further embodiments could include wherein the rotor shaft fairing includes a first surface facing the fuselage, a second, opposing surface facing away from the fuselage and an intermediate portion defined, at least in part by the leading edge portion, trailing edge portion and first and second side portions, the plate member being mounted to one of the first surface, second surface and intermediate portion.

In addition to one or more of the features described above or below, or as an alternative, further embodiments could include wherein the plate member is mounted to the intermediate portion.

In addition to one or more of the features described above or below, or as an alternative, further embodiments could include wherein the plate member includes a first plate member mounted to the first surface and a second plate member mounted to the intermediate portion.

In addition to one or more of the features described above or below, or as an alternative, further embodiments could include wherein the plate member includes a first plate member mounted to the second surface and a second plate member mounted to the intermediate portion.

In addition to one or more of the features described above or below, or as an alternative, further embodiments could include wherein the plate member includes a first plate member mounted to the first surface and a second plate member mounted to the intermediate portion, and a third plate member mounted to the second surface.

In addition to one or more of the features described above or below, or as an alternative, further embodiments could include wherein the plate member includes a first plate member extending from the first surface toward the trailing edge portion through the intermediate portion and a second plate member extending from the second surface toward the trailing edge portion through the intermediate portion.

In addition to one or more of the features described above or below, or as an alternative, further embodiments could include wherein the plate member includes a first plate member mounted to the first surface and a second plate member mounted to the second surface.

In addition to one or more of the features described above or below, or as an alternative, further embodiments could include wherein the rotor shaft fairing includes a chord length, the plate member projecting proudly of the rotor shaft fairing between about 2% and about 17% of the chord length.

In addition to one or more of the features described above or below, or as an alternative, further embodiments could include wherein the plate member projects proudly of the rotor shaft fairing between about 8% and about 13% of the chord length.

In addition to one or more of the features described above or below, or as an alternative, further embodiments could include an active air discharge opening extends through the outer surface of the rotor shaft fairing, and an active air generation system mounted in one of the fuselage and the rotor assembly. The active air generation system is configured and disposed to generate and direct a flow of air out through the active air discharge opening to disrupt an airstream flowing over the outer surface of the rotor shaft fairing.

In addition to one or more of the features described above or below, or as an alternative, further embodiments could include wherein the rotor shaft fairing includes a first surface facing the fuselage, a second, opposing surface facing away from the fuselage and an intermediate portion defined, at least in part, by the outer surface extending therebetween, the plate member being mounted to one of the first surface and the second surface.

In addition to one or more of the features described above or below, or as an alternative, further embodiments could include wherein the plate member includes a first plate member mounted to the first surface and a second plate member mounted to the second surface.

In addition to one or more of the features described above or below, or as an alternative, further embodiments could include wherein the active air discharge opening extends between the first and second plate members.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
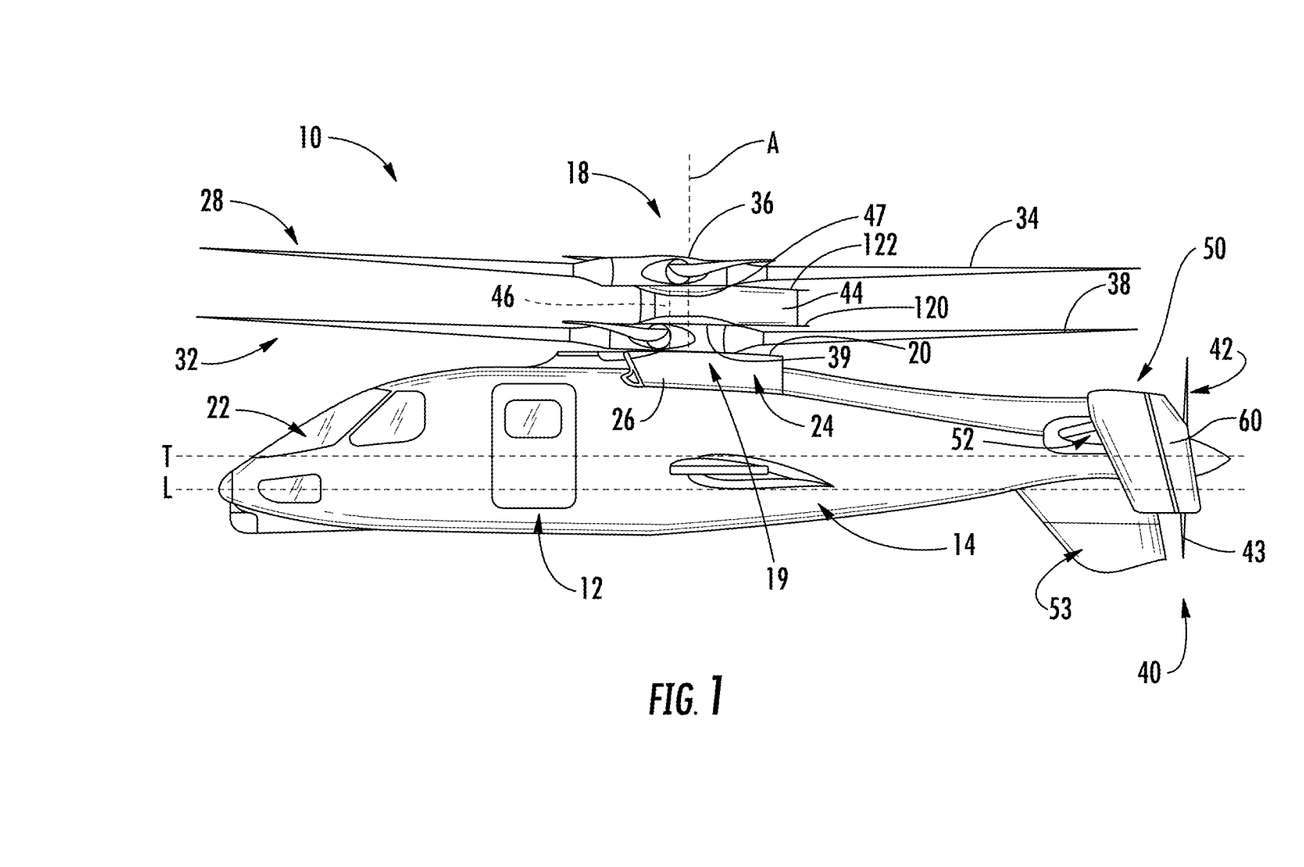
FIG. 1 depicts a rotary wing aircraft, in accordance with an exemplary embodiment.
Figure 2:
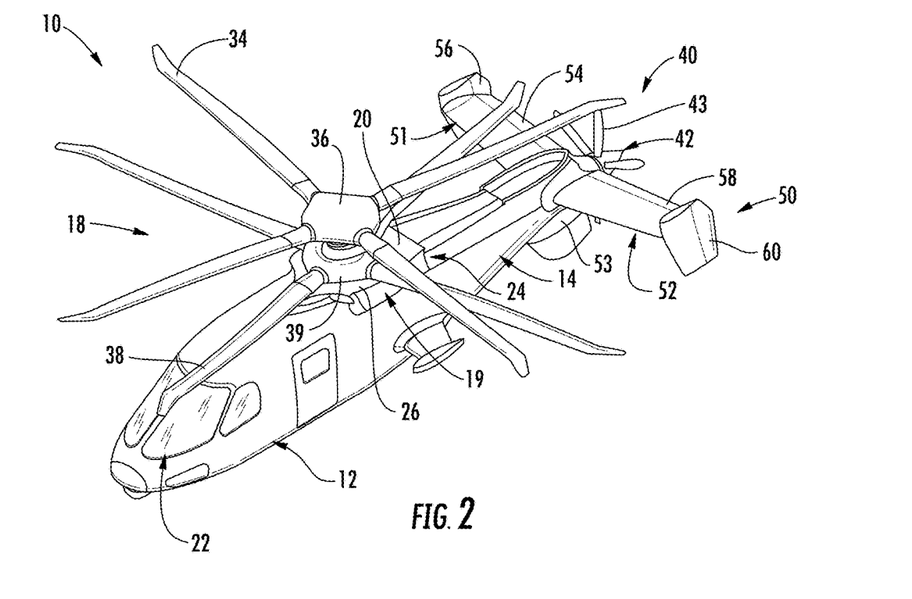
FIG. 2 is a perspective view of a rotary wing aircraft, in accordance with an exemplary embodiment.

FIGS. 1 and 2 depict an exemplary embodiment of a rotary wing, vertical takeoff and land (VTOL) aircraft 10. The aircraft 10 includes an airframe or fuselage 12 with an extending tail 14. A dual, counter rotating, coaxial main rotor assembly 18 extends outwardly from a pylon 19 having an upper surface 20 and rotates about a main rotor axis, A. In an exemplary embodiment, the fuselage 12 includes a cockpit 22 having two seats for flight crew (e.g., pilot and co-pilot) and six seats for passengers (not shown). Main rotor assembly 18 is driven by a power source, for example, one or more engines 24 via a gearbox 26. Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors).

In the exemplary embodiment shown, upper rotor assembly 28 includes a first plurality of rotor blades 34 supported by a first or upper rotor hub 36. Lower rotor assembly 32 includes a second plurality of rotor blades 38 supported by a second, or lower rotor hub 39. In some embodiments, the aircraft 10 may include a translational thrust system 40 having a propeller 42 located at the extending tail 14 to provide translational thrust (forward or rearward) for aircraft 10. Propeller 42 includes a plurality of blades 43.

Main rotor assembly 18 also includes a rotor shaft fairing 44 generally located between and around the upper and lower rotor assemblies 28 and 32 such that lower rotor hub 39 may be at least partially contained therein. Rotor shaft fairing 44 extends about a rotor shaft 46 operatively connecting upper rotor assembly 28 and engine(s) 24. Rotor shaft fairing 44 extends between lower rotor hub 39 and an upper hub member 47 arranged inwardly of upper rotor assembly 28 and operates to reduce drag which might otherwise exist at rotor shaft 46. First plurality of rotor blades 34 is connected to upper rotor hub 36 in a hingeless manner, also referred to as a rigid rotor system. Similarly, second plurality of rotor blades 38 is connected to lower rotor hub 39 in a hingeless manner.

Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors. Further, it should be understood that exemplary embodiments could also be incorporated into a rotary wing aircraft having a single rotor assembly.

Propeller 42, or translational thrust system 40, is connected to, and driven by, the engine 24 via the gearbox 26. Translational thrust system 40 may be mounted to the rear of the fuselage 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to, or instead of, translational thrust. It should be understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 3:
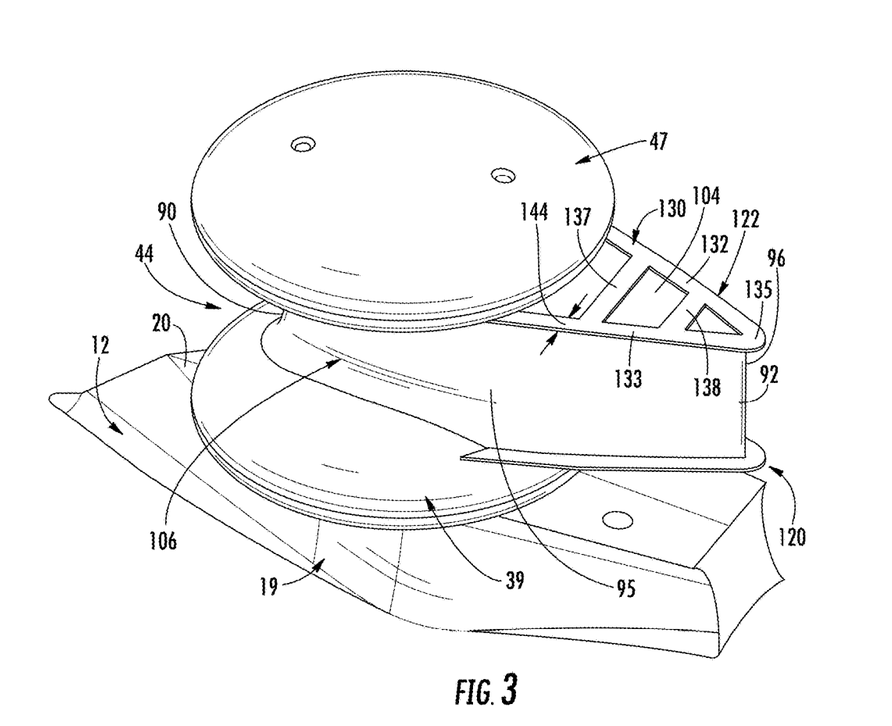
FIG. 3 depicts a rotor shaft fairing including first and second plate members, in accordance with an exemplary embodiment.
Figure 4:
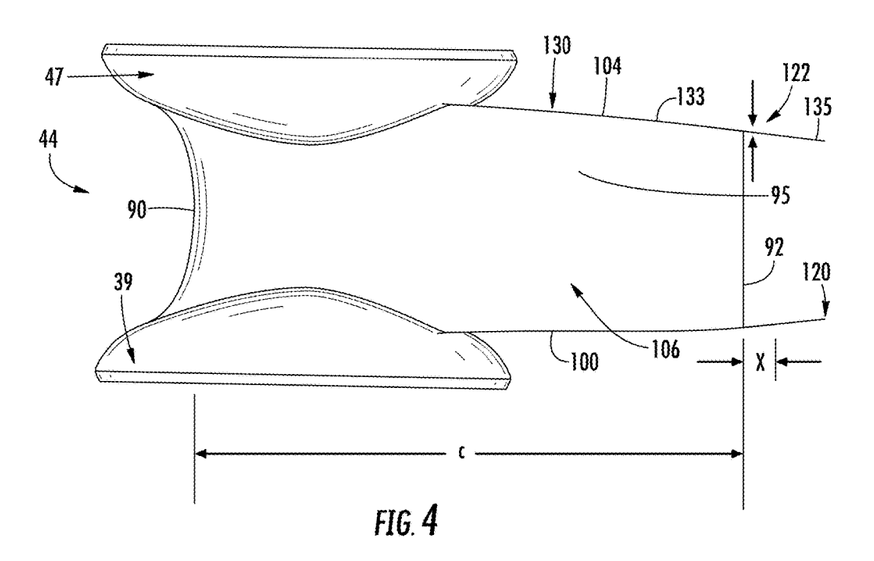
FIG. 4 depicts a side view of the shaft fairing of FIG. 3.

In accordance with an aspect of an exemplary embodiment illustrated in FIGS. 3 and 4, wherein rotor assembly 18 has been removed for sake of clarity and understanding, rotor shaft fairing 44 includes a forward or leading edge surface portion 90, and an aft or trailing edge surface portion 92. A first lateral side surface portion 95 extends between leading edge surface portion 90 and trailing edge surface portion 92. Similarly, a second, opposing lateral side surface portion 96 extends between leading edge portion 90 and trailing edge portion 92. Rotor shaft fairing 44 also includes a first or lower surface 100 facing fuselage 12 and lower hub member 39 and a second or upper surface 104 facing away from fuselage 12 and supporting upper hub member 47. First surface 100 is separated from second surface 104 by an intermediate portion 106 defined, at least in part, by first and second lateral side surface portions 95 and 96. Rotor shaft fairing 44 is also shown to include a chord length "C" extending between leading edge portion 90 and trailing edge portion 92.

In accordance with an exemplary embodiment, rotor shaft fairing 44 includes a first plate member 120 mounted at first surface 100 and a second plate member 122 mounted at second surface 104. As each plate member 120 and 122 is substantially similarly formed, a detailed description will follow to second plate member 122 with an understanding that first plate member 120 includes similar structure. Second plate member 122 includes a body 130 having a first edge portion 132 and a second edge portion 133. First and second edge portions 132 and 133 join at a tip portion 135 which, as will be discussed more fully below, projects proudly of rotor shaft fairing 44. Second plate member 122 also includes first and second cross members 137 and 138 that extend between and connect with first and second edge portions 132 and 133. First and second plate members 120 and 122 increase an aspect ratio of and reduce drag on, rotor shaft fairing 44.

In accordance with an aspect of exemplary embodiment, plate member 120 and plate member 122 may operate in conjunction to reduce gas diffusion over an aft portion (not separately labeled) of rotor shaft fairing 44. Reducing gas diffusion results in a higher velocity gas flow through the aft portion of rotor shaft fairing 44. Additionally, reducing gas diffusion reduces drag on rotor shaft fairing 44. In accordance with an exemplary embodiment, plate member 120 and/or plate member 122 substantially prevents gas flow mixing stemming from lower hub member 39, rotor shaft fairing 44 and/or upper hub member 47 thereby reducing an associated velocity deficit or wake and drag.

In accordance with an aspect of an exemplary embodiment, second plate member 122 is formed from a material similar to that used to form rotor shaft fairing 44. For example, second plate member 122 may be formed from a fiberglass material or a composite material that may include fiberglass, and/or carbon, and/or other lightweight, high strength materials. Second plate member 122 includes a thickness that may depend on operational considerations of aircraft 10. More specifically, second plate member 122 includes a minimal thickness that is not excited by aerodynamic instabilities and also does not approach material structural limits for expected air loads.

In further accordance with an aspect of an exemplary embodiment, first and second edge portions 132 and 133 and tip portion 135 project proudly of corresponding ones of first and second lateral side surface portions 95 and 96, and trailing edge portion 92. In accordance with an aspect of an exemplary embodiment, first and second edge portions 132 and 133 and tip portion 135 project a distance "x" from corresponding ones of first and second lateral side surface portions 95 and 96, and trailing edge portion 92. In accordance with one aspect of an exemplary embodiment, "x" equates to a distance of between about 2% and 17% of chord "C". In accordance with another aspect of an exemplary embodiment, "x" equates to a distance of between about 8% and 13% of chord "C". In accordance with another aspect of an exemplary embodiment, first and second edge portions 132 and 133 include a width 144 that may be about "2x".

Figure 5:
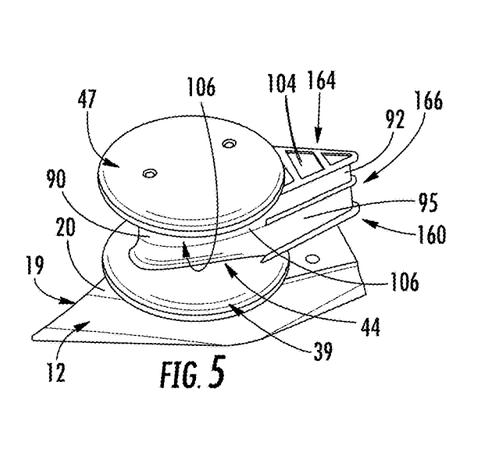
FIG. 5 depicts a rotor shaft fairing having first, second, and third plate members, in accordance with an aspect of an exemplary embodiment.
Figure 6:
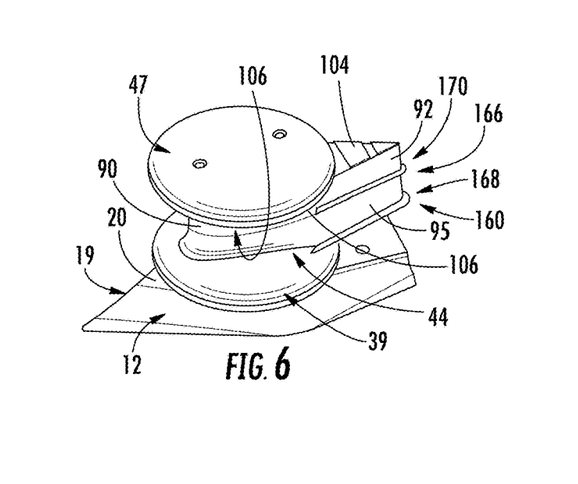
FIG. 6 depicts a rotor shaft fairing having first, and second plate members, in accordance with another aspect of an exemplary embodiment.
Figure 7:
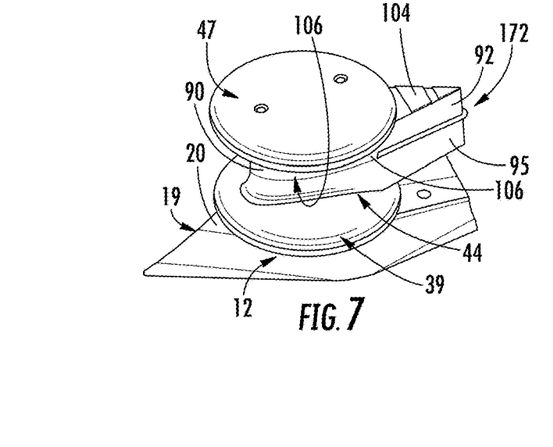
FIG. 7 depicts a rotor shaft fairing including a plate member, in accordance with yet another aspect of an exemplary embodiment.
Figure 8:
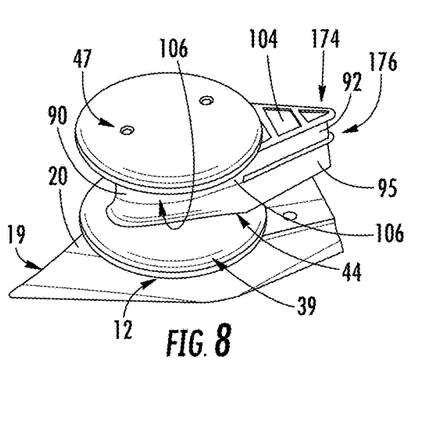
FIG. 8 depicts a rotor shaft fairing including first and second plate members, in accordance with still another aspect of an exemplary embodiment.
Figure 9:
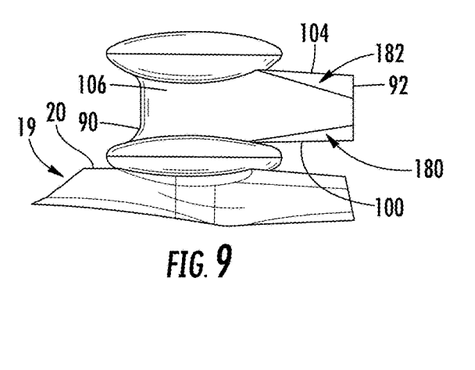
FIG. 9 depicts a rotor shaft fairing including first and second plate member, in accordance with yet still another aspect of an exemplary embodiment.

At this point, it should be understood that the number and location of plate members may vary. For example, FIG. 5, in which like reference numbers represent corresponding parts in the respective views, depicts a first plate member 160 on first surface 100, a second plate member 164 on second surface 104 and a third plate member 166 arranged on intermediate portion 106. FIG. 6 depicts a first plate member 168 arranged on first surface 100 and a second plate member 170 arranged on intermediate portion 106. FIG. 7 depicts a single plate member 172 arranged on intermediate portion 106. FIG. 8 depicts a first plate member 174 on second surface 104 and a second plate member 176 arranged on intermediate portion 106. In FIG. 9, a first plate member 180 extends from first surface 100 toward trailing edge portion 92 along intermediate portion 106. Similarly, a second plate member 182 extends from second surface 104 towards trailing edge 92 through intermediate portion 106. First and second plate members 180 and 182 converge downstream of trailing edge 92.

Figure 10:
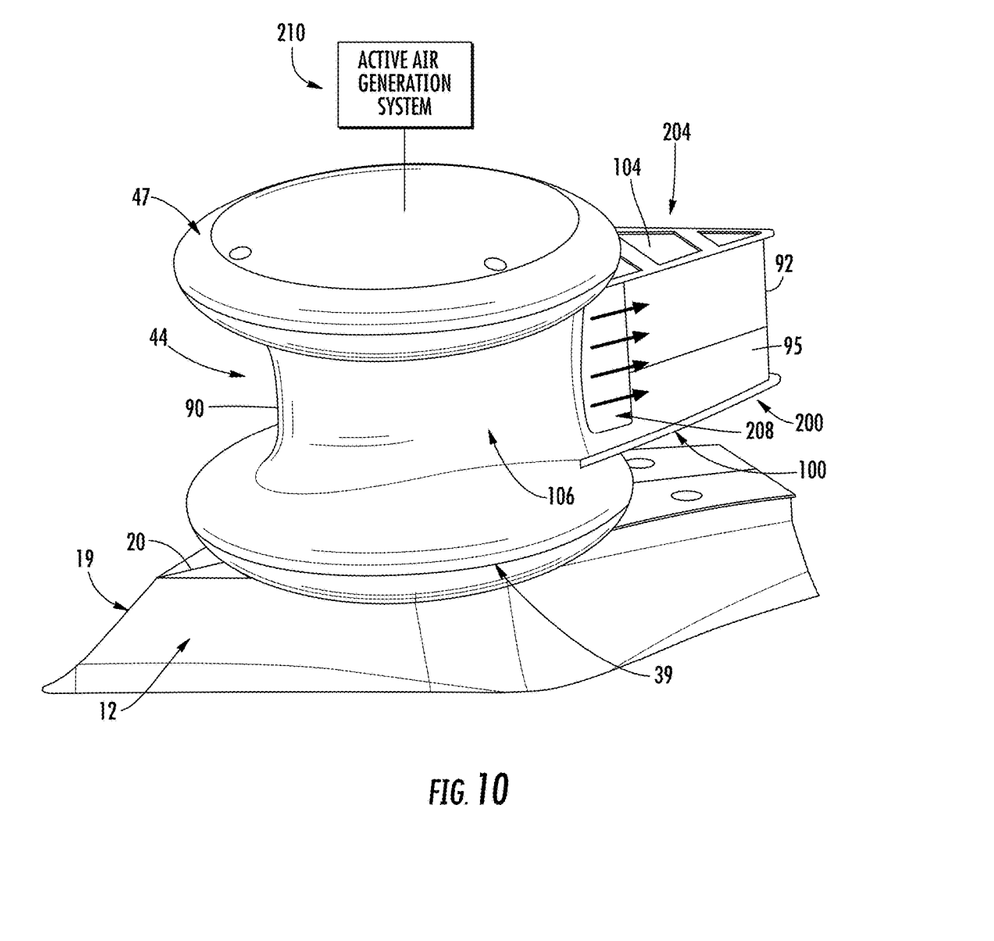
FIG. 10 depicts a rotor shaft fairing including first and second plate members and an active air discharge opening in accordance with an aspect of an exemplary embodiment.

Reference will now follow to FIG. 10, wherein like reference numbers represent corresponding parts in the respective views, illustrates a first plate member 200 arranged on first surface 100 and a second plate member 204 arranged on second surface 104. In accordance with the exemplary aspect shown, rotor shaft fairing 44 includes an active air discharge opening 208 arranged in first lateral side surface portion 95. A similar active air discharge opening (not shown) may be arranged in second lateral side surface portion 96. Active air discharge opening 208 is operatively connected to an active air generation system 210. Active air generation system 210 may be arranged in fuselage 12, rotor assembly 18 or other portions of aircraft 10 and, in operation, generates and directs a flow of air through active air discharge opening 208 and along first lateral side surface portion 95 between first and second plate members 200 and 204. Additional air flow may be directed along second lateral side surface portion 96. The flow of air creates vortices on first and second lateral side surface portions 95 and 96 that further reduce drag on rotor shaft fairing 44.

It should be understood that while described in terms of reducing draft on a shaft fairing and a hub, exemplary embodiments could be employed on other surfaces of the aircraft. Further, it should be understood that the exemplary embodiments are not limited to deployment on rotary wing aircraft and could be utilized on other aircraft designed such as fixed wing aircraft, as well as manned and un-manned aircraft. Additionally, while shown on the shaft fairing, plate members may be provided on other surfaces such as on the upper surface of the fuselage, and the upper and/or side surfaces of the upper hub member.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary wing aircraft comprising:
   a fuselage including a plurality of surfaces;
   at least one engine mounted in the fuselage;
   a rotor assembly including a rotor shaft and plurality of rotor blades operatively connected to the rotor shaft, the rotor assembly including a plurality of surface portions;
   a rotor shaft fairing extending between the fuselage and the rotor assembly and about at least a portion of the rotor shaft, the rotor shaft fairing including a first surface facing the fuselage, a second, opposing surface facing away from the fuselage and an intermediate portion defined, at least in part by the leading edge portion, trailing edge portion and first and second side portions; and
   a plate member mounted to one of the first surface and the second surface and projecting proudly of at least a portion of the rotor shaft fairing, the plate member increasing an aspect ratio of and reducing induced drag on the rotor shaft fairing.

2. The rotary wing aircraft according to claim 1, wherein the rotor shaft fairing includes a leading edge surface portion, a trailing edge surface portion, a first lateral side surface portion extending between the leading edge surface portion and the trailing edge surface portion and a second, opposing lateral side surface portion extending between the leading edge portion and the trailing edge portion, the plate member projecting proudly of the trailing edge portion and at least a portion of each of the first and second lateral side portions.

3. The rotary wing aircraft according to claim 1, wherein the plate member includes a first plate member mounted to the first surface and a second plate member mounted to the intermediate portion.

4. The rotary wing aircraft according to claim 1, wherein the plate member includes a first plate member mounted to the second surface and a second plate member mounted to the intermediate portion.

5. The rotary wing aircraft according to claim 1, wherein the plate member includes a first plate member mounted to the first surface and a second plate member mounted to the intermediate portion, and a third plate member mounted to the second surface.

6. The rotary wing aircraft according to claim 1, wherein the plate member includes a first plate member mounted to the first surface and a second plate member mounted to the second surface.

7. The rotary wing aircraft according to claim 1, wherein the rotor shaft fairing includes a chord length, the plate member projecting proudly of the rotor shaft fairing between about 2% and about 17% of the chord length.

8. The rotary wing aircraft according to claim 7, wherein the plate member projects proudly of the rotor shaft fairing between about 8% and about 13% of the chord length.

9. The rotary wing aircraft according to claim 8, wherein the rotor shaft fairing includes a first surface facing the fuselage, a second, opposing surface facing away from the fuselage and an intermediate portion defined, at least in part, by the outer surface extending therebetween, the plate member being mounted to one of the first surface and the second surface.

10. The rotary wing aircraft according to claim 9, wherein the plate member includes a first plate member mounted to the first surface and a second plate member mounted to the second surface.

11. The rotary wing aircraft according to claim 10, wherein the active air discharge opening extends between the first and second plate members.

12. The rotary wing aircraft according to claim 1, further comprising:
    an active air discharge opening extending through the outer surface of the rotor shaft fairing; and
    an active air generation system mounted in one of the fuselage and the rotor assembly, the active air generation system being configured and disposed to generate and direct a flow of air out through the active air discharge opening to disrupt an airstream flowing over the outer surface of the rotor shaft fairing.

\* \* \* \* \*